United States Patent
Peev et al.

(10) Patent No.: US 9,418,336 B2
(45) Date of Patent: Aug. 16, 2016

(54) AUTOMATIC RECOGNITION AND INSIGHTS OF DATA

(71) Applicant: Microsoft Corporation, Redmond, WA (US)

(72) Inventors: Igor Peev, Arlington, WA (US); Jimmy Y. Sun, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 315 days.

(21) Appl. No.: 13/958,176

(22) Filed: Aug. 2, 2013

(65) Prior Publication Data

US 2015/0039537 A1 Feb. 5, 2015

(51) Int. Cl.
*G06N 5/04* (2006.01)
*G06K 9/00* (2006.01)
*G06Q 30/00* (2012.01)

(52) U.S. Cl.
CPC .............. *G06N 5/04* (2013.01); *G06K 9/00496* (2013.01); *G06Q 30/00* (2013.01)

(58) Field of Classification Search
None
See application file for complete search history.

(56) References Cited

U.S. PATENT DOCUMENTS

| 7,363,584 B1 | 4/2008 | Molesky |
| 8,185,816 B2 | 5/2012 | Davis |
| 2004/0205524 A1 | 10/2004 | Richter et al. |
| 2009/0150411 A1 | 6/2009 | Laaser et al. |
| 2012/0053986 A1 | 3/2012 | Cardno et al. |
| 2012/0154402 A1 | 6/2012 | Mital et al. |

FOREIGN PATENT DOCUMENTS

EP  2568427 A1  3/2013

OTHER PUBLICATIONS

"Automated Insights—Products and Solutions", Retrieved at<<http://automatedinsights.com/products_and_solutions>>, Jan. 15, 2013, pp. 6.
Hermans, et al., "Automatically Extracting Class Diagrams from Spreadsheets", Retrieved at<<http://www.st.ewi.tudelft.nl/~arie/papers/perplex/TUD-SERG-2010-013.pdf>>, In Proceedings of the 24th European Conference on Object-Oriented Programming, Jun. 21, 2010, pp. 30.
Kandel, et al., "Profiler: Integrated Statistical Analysis and Visualization for Data Quality Assessment", Retrieved at <<http://vis.stanford.edu/files/2012-Profiler-AVI.pdf>>, In Proceedings of the International Working Conference on Advanced Visual Interfaces, May 21, 2012, pp. 8.
"SAS® Visual Analytics", Retrieved at<<http://www.sas.com/software/visual-analytics/overview.html>>, Retrieved date: May 10, 2013, pp. 6.

(Continued)

*Primary Examiner* — Kakali Chaki
*Assistant Examiner* — Michael Zidanic
(74) *Attorney, Agent, or Firm* — Damon Rieth; Jim Ross; Micky Minhas

(57) ABSTRACT

Automatic recognition and presentation of insights of data is provided through analysis of overall data to infer locations of a user's data. Statistical, heuristic, and comparable analysis on the user's data sets is used to determine insights such as trends, correlations, outliers, comparisons, and patterns. The insights are then presented to the user through automatically optimized visualizations (highlighting determined insights), emphasis on presented raw data, data formatting suggestions, and similar ones with the capability to explore further.

17 Claims, 7 Drawing Sheets

(56) References Cited

OTHER PUBLICATIONS

"Go Beyond Simple Reporting", Retrieved at<<http://www.data-applied.com/Web/Products/Overview.aspx>>, Dec. 5, 2009, pp. 5.

"About Fusion Tables", Retrieved at <<http://support.google.com/fusiontables/answer/2571232?hl=en>>, Dec. 21, 2012, pp. 4.

"International Search Report and Written Opinion Issued in PCT Patent Application No. PCT/US2014/048997", Mailed Date: Mar. 11, 2015, 7 Pages.

FIG. 2

AUTOMATIC RECOGNITION AND INSIGHTS OF DATA

BACKGROUND

Analysis, processing, and visualization of various types and forms of data has become an integral part of daily business and even personal lives of many people with the proliferation of computing technologies. From business data such as sales, marketing reviews to student performance data in schools, people from a wide range of backgrounds and skill levels view, process, and try to make sense of ever increasing amounts of data.

A typical scenario for data analysis and viewing includes a user looking at a spreadsheet containing various dimensions of data trying to analyze through formulas or charts, commonly set up through manual configuration. Even to reach some level of automation, users typically have to have a general understanding of the data in front of them, select portions (data sets within overall data), select suitable analysis tools (for example, trending formulas, chart parameters, etc.). For small amount of data, this may not be a daunting task, but small amounts of data also provide a less accurate snapshot of the overall story. When more accurate results are desired or available data amounts are large, common, manual configuration based tools may be inadequate at best, unusable at worst.

Furthermore, size of a data set may often be not something in the user's direct control. Unless a user crafted the data by hand, they may have obtained it from another source. Many sources of data, especially sources that are more structured (e.g. a database, publically available data sets from the government, etc.) may be large enough to make manual analysis very difficult without the right tools and the proper know-how.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic recognition and presentation of insights in various types of data. In some examples, overall data may be analyzed and full extent of data sets within the overall data determined in order to infer locations of a user's data. The user's data sets may then be subjected to various analyses such as statistical, heuristic, and comparable ones to determine insights such as trends, correlations, outliers, comparisons, and patterns. The insights may be presented to the user in form of automatically optimized visualizations (highlighting determined insights), emphasis on presented raw data, data formatting suggestions, and similar ones with the capability to explore further.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 2 illustrates implementation of automatic recognition and presentation of insights in a spreadsheet environment;

DETAILED DESCRIPTION

Figure 1:
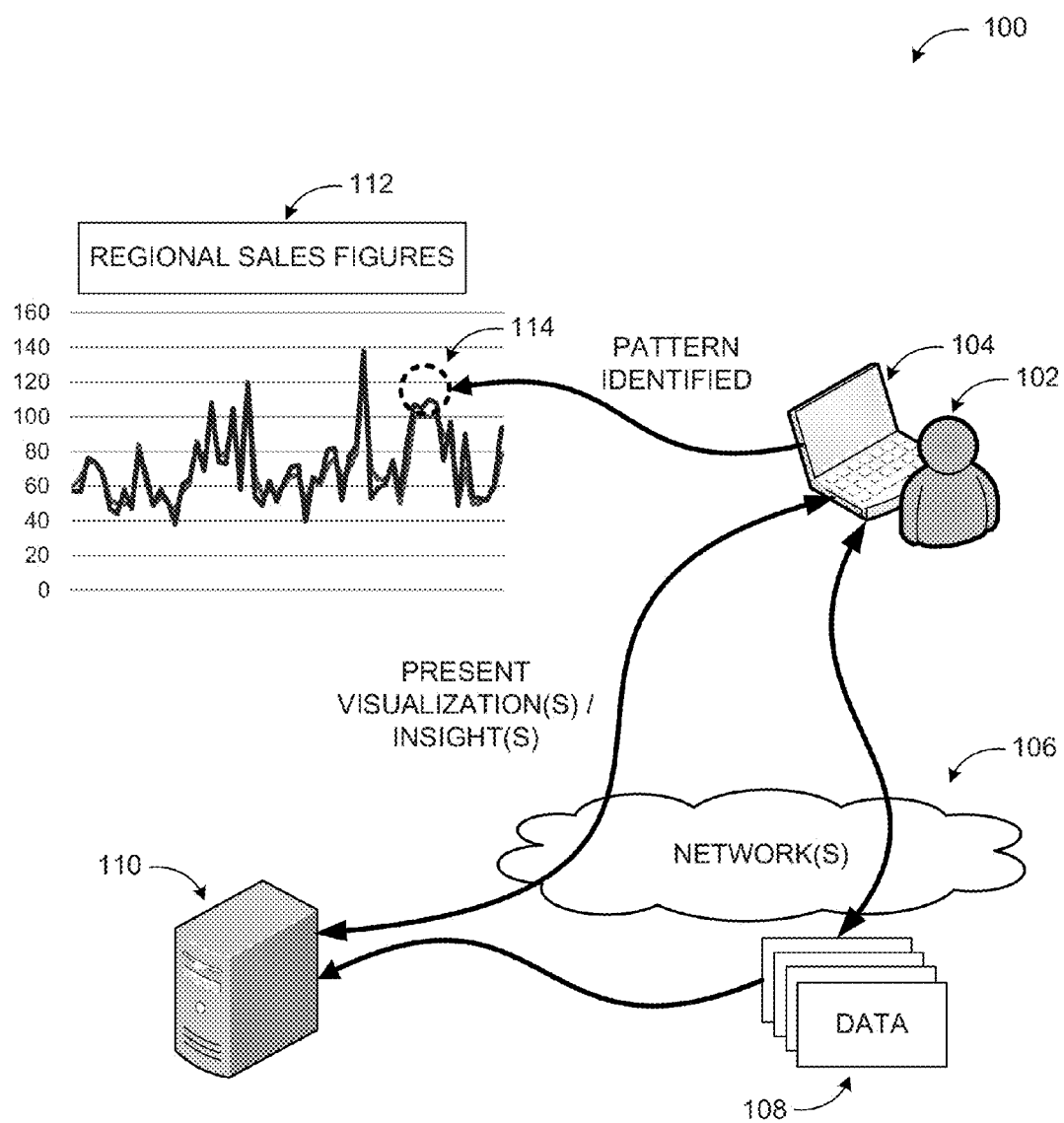
FIG. 1 is a conceptual diagram illustrating an example implementation data analysis and presentation of insights according to some embodiments.

As briefly described above, available data may be analyzed to infer locations of a user's data. The user's data may then be subjected to various analyses to determine insights such as trends, correlations, outliers, comparisons, and patterns. The insights may be presented to the user in form of automatically optimized visualizations, emphasis on presented raw data, data formatting suggestions, and similar ones.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices. Furthermore, embodiments may be implemented in computing devices capable of touch, gesture, eye-tracking, voice-command, gyroscopic, pen, and comparable interaction mechanisms in addition to keyboard and mouse inputs.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for providing automatic recognition and presentation of insights into analyzed data. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example implementation data analysis and presentation of insights according to some embodiments.

As shown in diagram 100, a process of providing analysis and presentation of insights may begin with underlying data 108. The underlying data 102 may be structured, unstructured, and formatted in various formats. In a networked environment, the underlying data 108 may be managed by a hosted service represented by server 110 and provided to a user 102 through a thick or thin client application executed on the user's client device 104 via one or more networks 106. Alternatively, the user 102 may retrieve the underlying data 108 from a data store directly and utilize the hosted service (e.g., a productivity suite including a spreadsheet application) to analyze and understand.

According to some embodiments, the underlying data 102 may first be analyzed to identify user's data (i.e., data sets within the overall data that are of interest to the user). Type of data, context of data processing, user preferences, user permissions, structure of the data, and similar factors may be taken into account in this initial analysis. Once the locations of the user's data are inferred, various analyses such as statistical, transformational, heuristic, etc. may be applied to the user's data sets to determine insights such as trends, patterns, correlations, comparisons, and similar ones.

The insights may then be presented to the user through visualizations such as chart 112 that are selected and configured to highlight the presented insight (e.g., pattern 114). The insights may also be presented through emphasis on raw data (e.g., highlighting, shading, or otherwise emphasizing particular data sets or subsets thereof on a spreadsheet) or data formatting suggestions (again on the spreadsheet).

According to some embodiments, machine learning algorithms or similar techniques may be employed to detect user actions following presentation of insights (e.g., particular columns being changed or modified, specific insights being kept while others deleted, etc.) and learn from those actions. The learning mechanism may then be used to adjust future recognition and insight presentation operations.

In addition to hosted service environments, embodiments may also be implemented by locally installed data processing applications such as spreadsheet applications, database applications, presentation applications, note taking applications, or even word processing applications. Furthermore, various interaction mechanisms such as keyboard/mouse, touch, gesture, pen, eye-tracking, voice command, gyroscopic, and similar input mechanisms may be employed to interact with the system and select various parameters.

Figure 2:
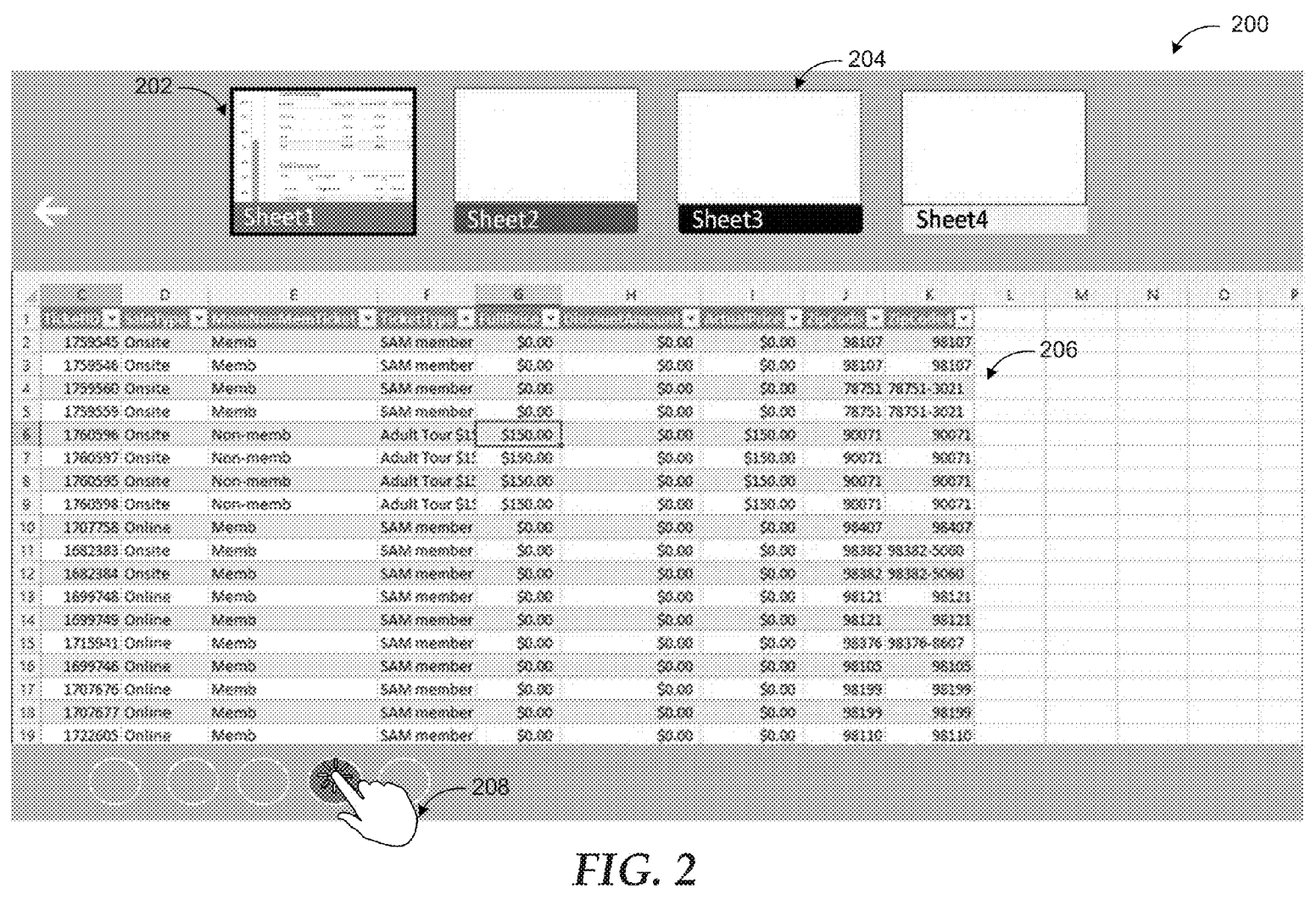

FIG. 2 illustrates implementation of automatic recognition and presentation of insights in a spreadsheet environment.

Diagram 200 shows a user interface of a data processing application such as a spreadsheet application presenting data in tabular format. While the presented data 206 is inconsequential for the purposes of this illustration, it should be noted that the data includes dimensions such as columns and rows. Automatic recognition and presentation of insights may begin automatically upon loading of the data to the application or detecting activation of a control element 208.

In one example embodiment, tabular data presented to a user in a two dimensional table may include different dimensions. For example, the columns may represent various products, while the rows may represent sales figures for different time periods (e.g., months). Furthermore, the spreadsheet may include portions of complete and/or incomplete data that may be of interest to various users. The spreadsheet may also contain data in multiple sheets adding a third dimension to the scenario.

The initial analysis for detecting location(s) of user data may reveal overall statistics about the data such as how many rows/columns, how many incomplete rows, etc. Upon detection of the data ranges (in other words: user data sets), various capabilities such as semantic zoom may be enabled. Next, the user data sets may be analyzed within the context of the overall data and any user-specific information to determine insights into the data. This level of analysis may include statistical, transformational, heuristic, and similar analyses. Resulting insights may be presented to the user in form of visualizations (e.g., charts) in some embodiments. The suggested charts highlighting discovered insights may be presented as a page under each analyzed sheet. In other embodiments, multiple suggestions (charts) may be presented in a miniaturized form (e.g., sheets 202, 204) and details of the visualization may be displayed upon selection of one of the miniaturized suggestions.

Figure 3:
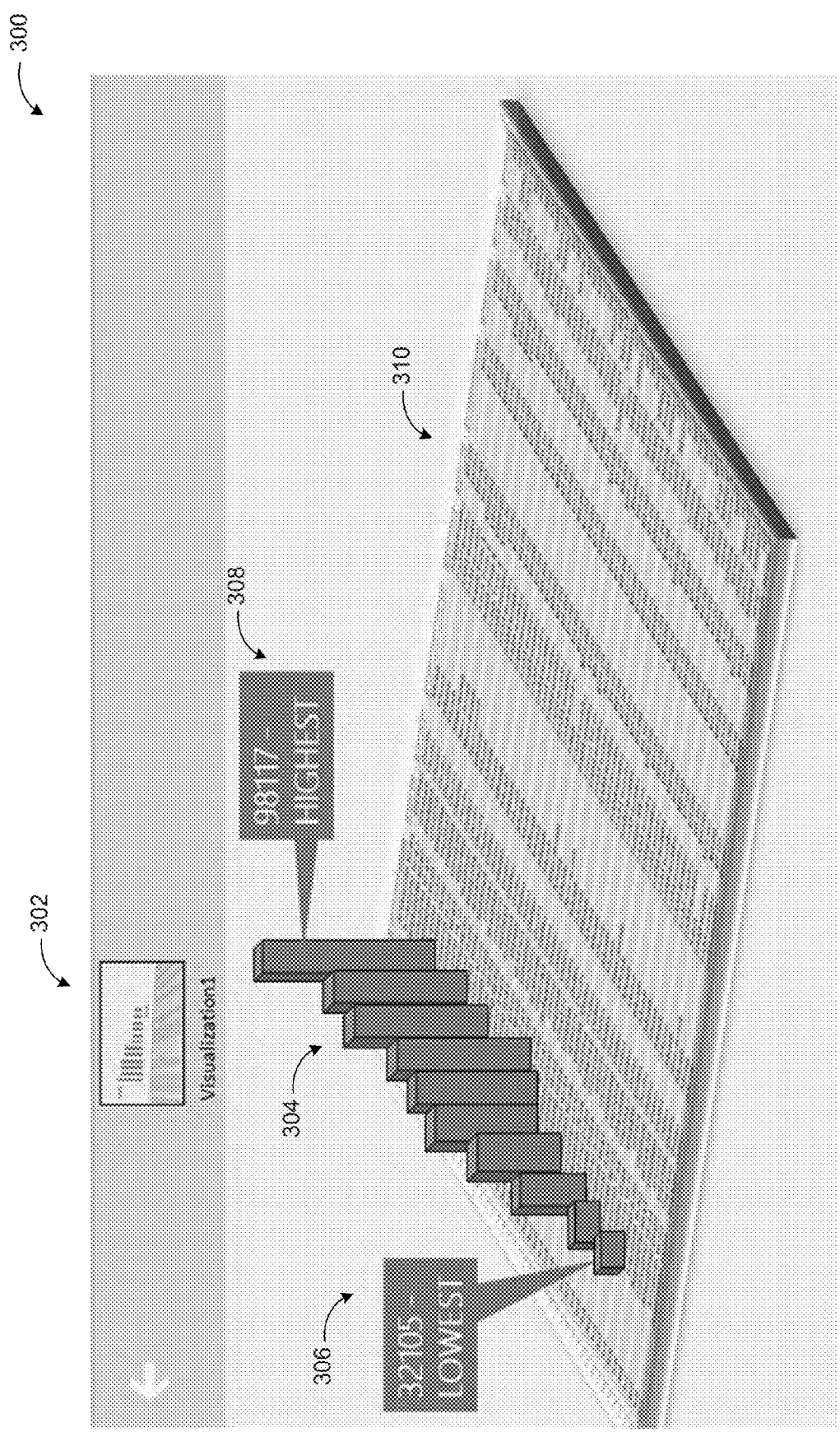
FIG. 3 illustrates presentation of an example chart based data visualization based on automatic recognition and determination of insights into tabular data.

FIG. 3 illustrates presentation of an example chart based data visualization based on automatic recognition and determination of insights into tabular data.

Diagram 300 shows one example visualization that includes a three dimensional chart 304 of a trend detected in one of the columns of the overall data displayed over a three dimensional background of the spreadsheet 310 itself. The use of the spreadsheet 310 as background may provide a visual connection to the user tying the visualized insight to a location of its underlying data on the spreadsheet. In the example scenario, the visualized data set may be sales figures according to zip codes with the chart 304 presenting the sales figures in an increasing trend (making the trend visible and enabling the user to compare differences between different zip codes graphically. Further enhancements may include highlights such as textual and/or graphical emphasis of certain data points (zip codes with lowest 306 and highest 308 sales figure values).

As discussed above, multiple visualizations may be generated for a single data set, for example, one for highlighting the detected trend, another for highlighting outliers, yet another for highlighting comparisons. Furthermore, different visualizations may be generated for multiple data sets associated with the user within the same spreadsheet. Such visualizations may be presented for selection as icons in miniaturized form such as icon 302. While one icon is shown on the example user interface, many such icons may be presented in expanded or collapsed forms for user selection.

In some embodiments, the user may be enabled to further explore the data and the insights by selecting available choices to change the visualization (or other presentation of the insight) parameters, switching to the underlying data, trying alternative scenarios based on the presented insight, and so on. The selections may be presented in various ways (e.g., a dropdown menu, a radial menu, a pop-up menu, direct action based on touch/gesture, etc.) on or outside the user interface. The selections may also be dynamically changeable depending on the underlying data, type of visualization, user preferences, and similar factors.

As shown in diagram 300, the chart 304 may be placed (automatically or based on user selection) over the portion of the background containing the underlying portion of the data and aligned with that column providing further visual correlation. Other parameters such as colors, bar sizes, borders, etc., may be predefined, user selectable, and/or automatically configurable based on the composition of the scene.

Multiple visualizations may also be used according to some embodiments. For example, two or more three dimensional bar chart based visualizations may be presented in alignment with their respective underlying data on the tabular data background (spreadsheet) allowing the user to compare the trends and variations in data visually. Visualizations are not limited to bar charts or any charts. Other visualizations such as free form representations may also be employed. In addition to using the underlying data as background, other backgrounds such as images or graphics associated with the underlying data (e.g., a picture of a bicycle for data representing bicycle sales, construction plans of a building under construction, a map of a geographic region associated with the underlying data, etc.) may also be selected automatically or by the user as backgrounds.

Figure 4:
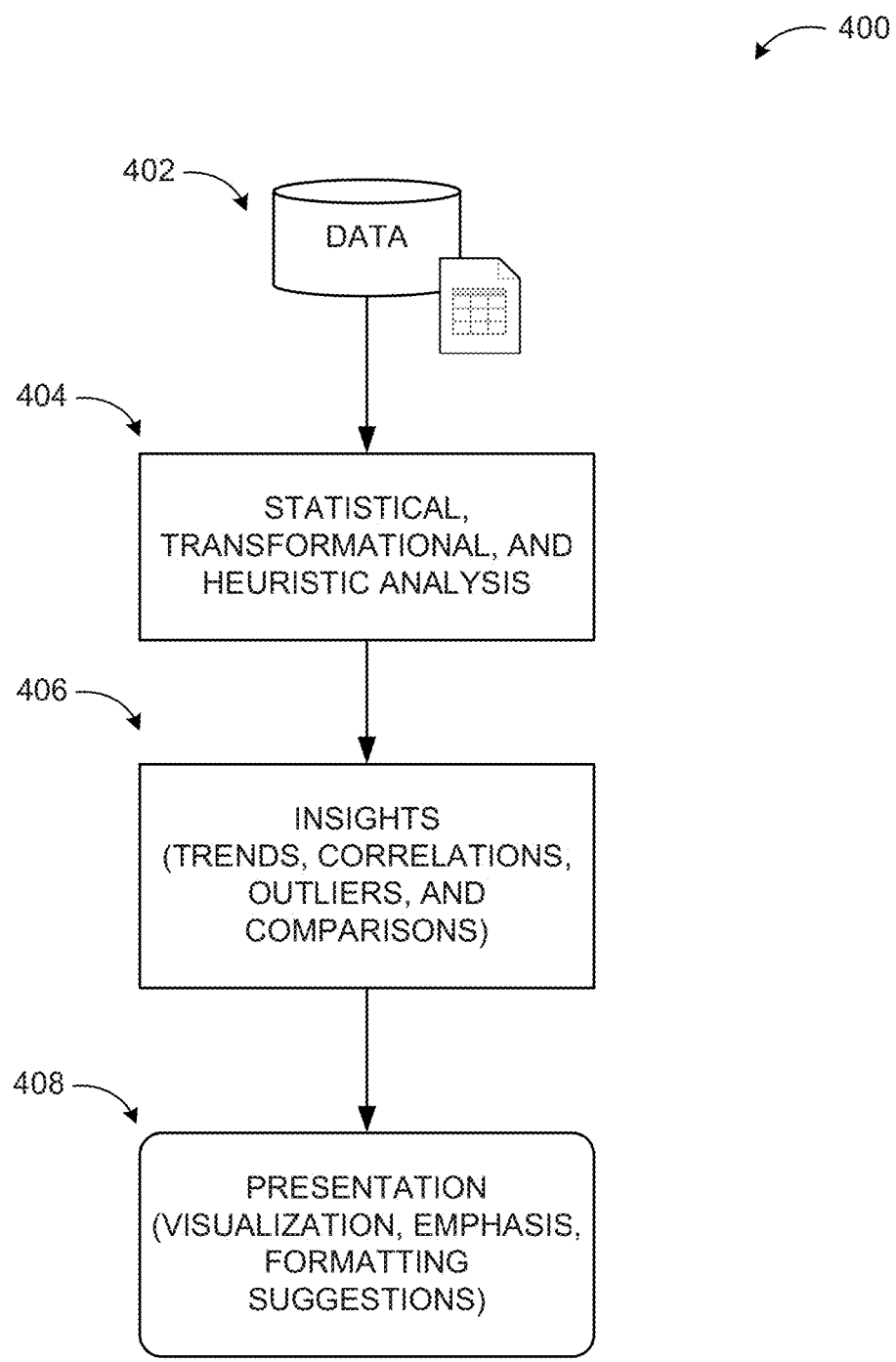
FIG. 4 illustrates a block diagram of a flow for automatic recognition and presentation of insights according to some embodiments.

FIG. 4 illustrates a block diagram of a flow for automatic recognition and presentation of insights according to some embodiments.

As shown in diagram 400, the underlying data 402 such as a spreadsheet may be subjected to statistical, transformational, heuristic, and comparable analyses (404) to determine insights (406) such as trends, correlations, outliers, comparisons, patterns, etc. within the data. The insights may then be presented (408) as visualizations, emphasis on raw data, data formatting suggestions, and similar ones. Thus, the data processing application or service may explore and study data through automatic visualizations for the user without the user having to select portions of data, define analysis parameters, identify visualization configurations, etc.

A system according to embodiments may automatically infer the locations of the user's data without a need for the user to perform any pre-selection or highlighting prior to receiving a visualization. A variety of heuristics may be employed to identify the bounds of data sets. By scanning the user's data using a set of statistical, transformational, and heuristic approaches to uncover trends, correlations, outliers, and comparisons, users may be allowed to discover insights about their data automatically. For example, users may be told that ice cream sales correlate (increase with) temperature, or that ice cream sales in July were outliers compared to other months. Each insight may be backed with a visualization such that users are offered proof and the capability to explore further.

Automatically discovered insights may include, but are not limited to, overall statistics about the data, number of dimensions (e.g., rows/columns), number of incomplete rows, percentage of useless data, number of particular data types/values within the data, concentrations or percentages of the data inside certain entities, trends such as lowest, highest, fastest growing values, and similar ones.

The example scenarios and schemas in FIG. 1 through 4 are shown with specific components, analysis types, insights, visualizations, and configurations. Embodiments are not limited to systems according to these examples. Providing automatic recognition and presentation of insights may be implemented in configurations employing fewer or additional components in applications and user interfaces using the principles described herein.

Figure 5:
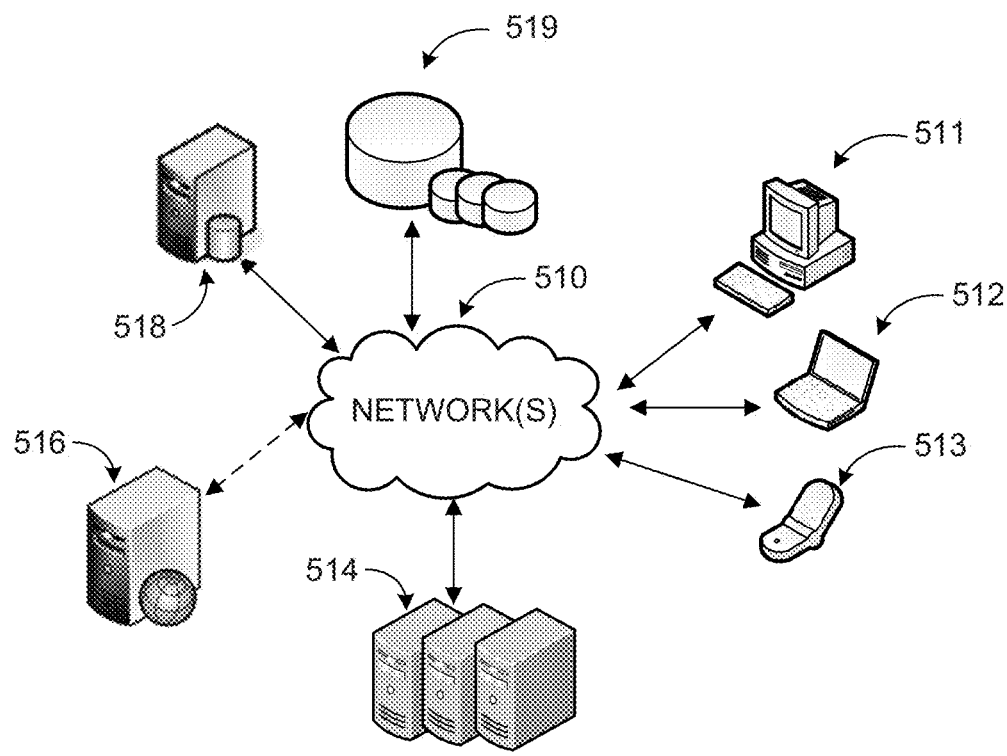
FIG. 5 is a simplified networked environment, where a system according to embodiments may be implemented.

FIG. 5 is an example networked environment, where embodiments may be implemented. A system for automatic recognition and presentation of insights of data may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516 in providing users data visualizations, analyses, reports, and so on. An insight engine executed as part of a spreadsheet application or service may perform the actions discussed herein. Updates or additional data associated with insights and visualization may be stored in data store(s) 519 directly or through database server 518 associated with the hosted service.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic. RF, infrared and other wireless media.

Many other configurations of computing devices, applications, data sources, and data distribution systems may be employed to provide automatic recognition and presentation of insights of data. Furthermore, the networked environments discussed in FIG. 5 are for illustration purposes only. Embodiments are not limited to the example applications, modules, or processes.

Figure 6:
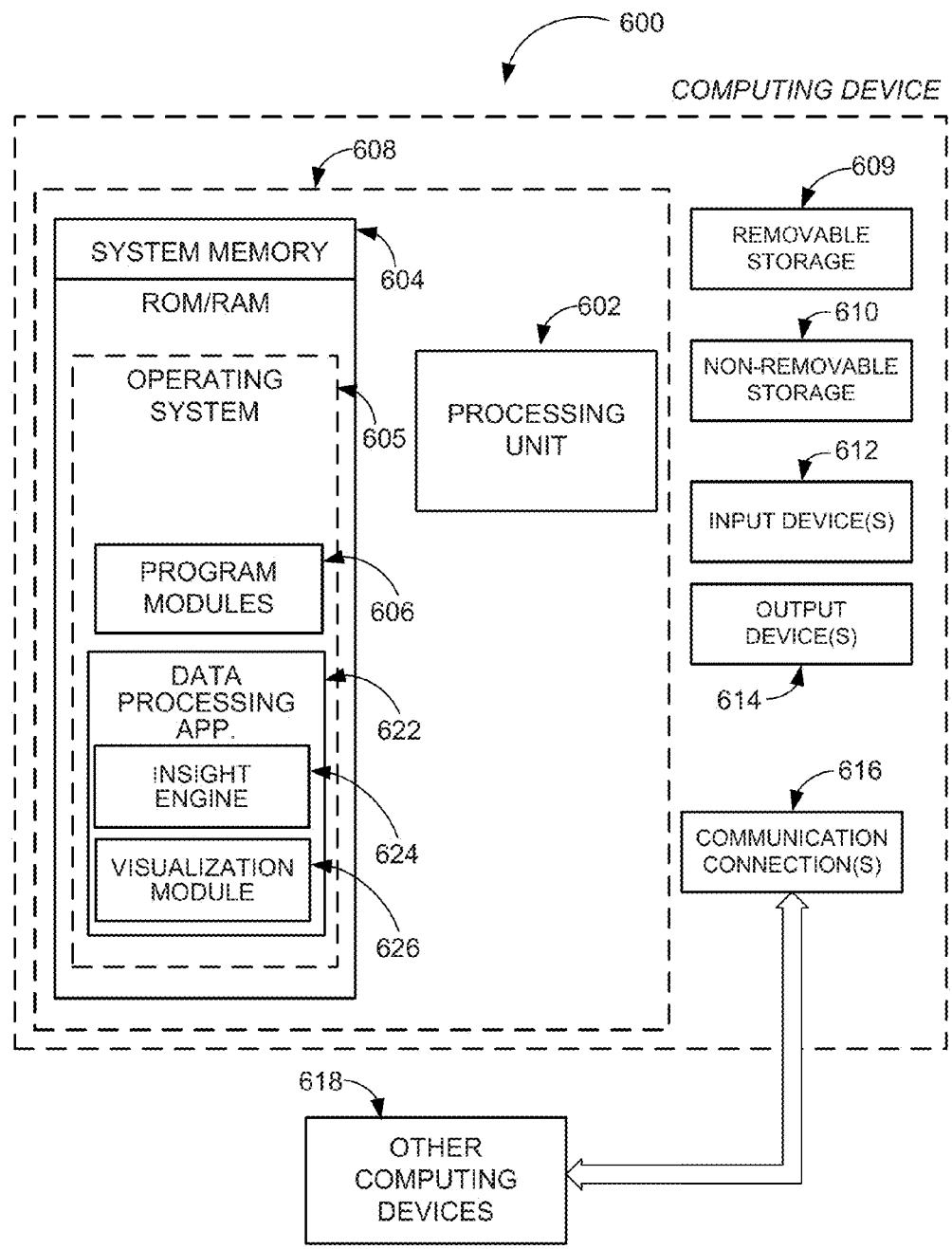
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a data processing application such as a spreadsheet application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, data processing application 622, an insight engine 624, and a visualization module 626.

Data processing application 622 may perform a variety of tasks on available data such as analyzing, presenting, enabling modification, update, etc. The data processing application 622 may operate in conjunction with the insight engine 624 and visualization module 626 to analyze the overall data and provide automatic recognition and presentation of insights as discussed above. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
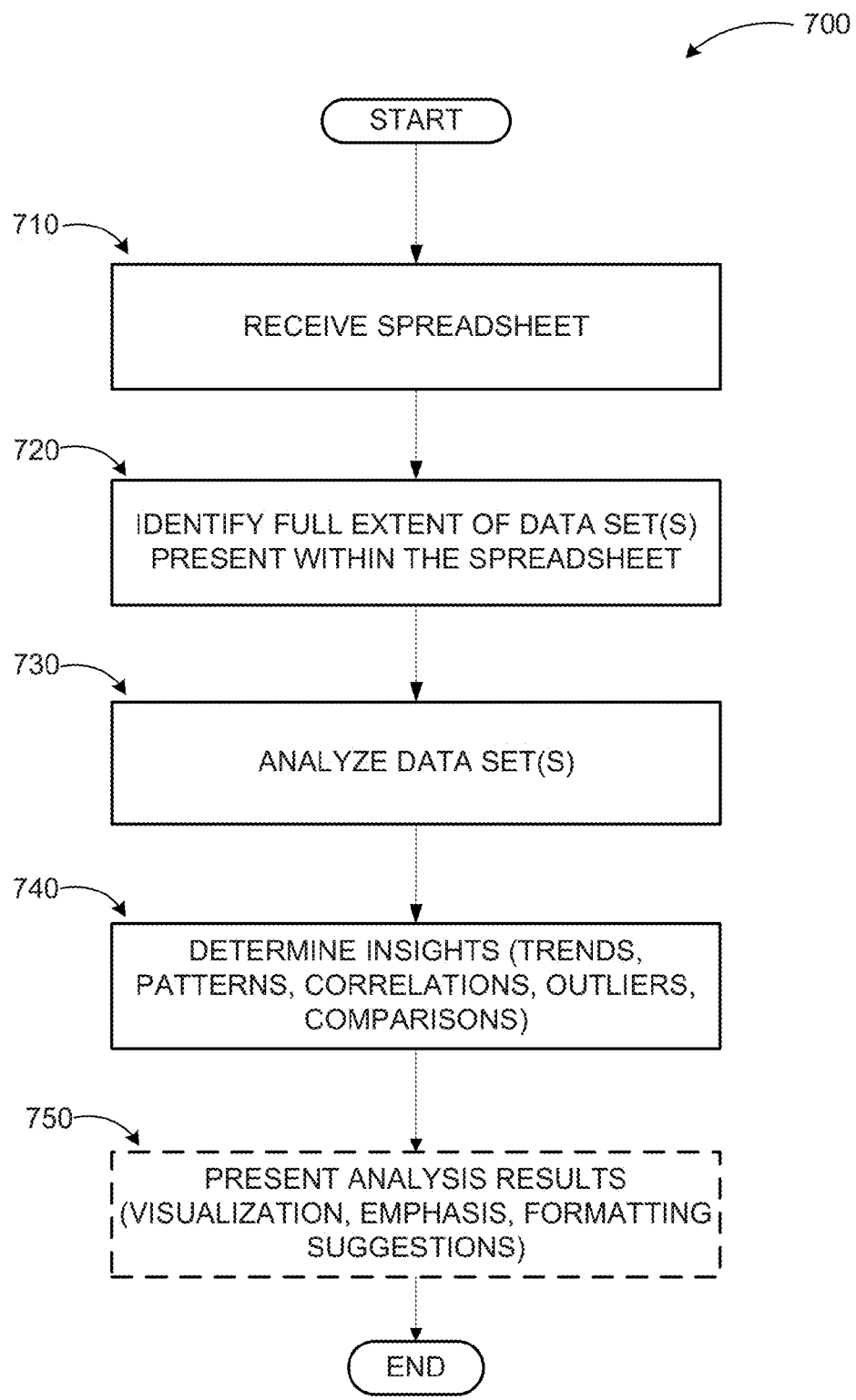
FIG. 7 illustrates a logic flow diagram for a process of providing automatic recognition and presentation of insights according to embodiments.

FIG. 7 illustrates a logic flow diagram for a process for providing automatic recognition and presentation of insights according to embodiments. Process 700 may be implemented in conjunction with an insight module within a data processing service or application such as a spreadsheet application.

Process 700 begins with operation 710, where underlying data may be received at the data processing application, for example, in form of a spreadsheet at a spreadsheet application. While spreadsheet application and data are used for illustrative example purposes herein, embodiments are not limited to implementations in spreadsheet environments and may be applied to any form of data in any data processing environment such as tables in a word processing application, a database application, and so on.

At operation 720, full extent of data sets present within the spreadsheet may be identified to automatically infer location(s) of user data (data sets). At operation 730, the identified user data sets may be analyzed employing various analysis techniques such as statistical, transformational, heuristic, and comparable analyses.

At operation 740, insights into the data may be determined based on the analysis results. The insights may include patterns, trends, correlations, outliers, comparisons, and similar determinations. The insights may then be presented to a user employing one or more of visualizations, emphasis on raw data sets, data formatting suggestions, and the like at optional operation 750. The presentations such as the visualizations may be automatically optimized to highlight discovered insights. For example, a chart type and chart parameters may be automatically selected to highlight a detected trend in a visualization for a particular data set.

The operations included in process 700 are for illustration purposes. Automatic recognition and presentation of insights of data may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for automatic recognition and insight derivation on data, the method comprising:
   receiving underlying data;
   inferring user data sets within the underlying data;
   analyzing the user data sets;
   determining one or more insights on the user data sets based on analysis results, the one or more insights including one or more of a trend, a correlation, an outlier, a pattern, and a comparison for each data set or combinations of data sets;
   presenting a visualization of one or more user data sets highlighting an insight associated with each data set from the one or more insights, an emphasis on presented raw underlying data, and a data formatting suggestion, wherein the visualization is a chart highlighting the insight, the emphasis on the presented raw underlying data is one of a shading and a highlighting of a portion of the raw underlying data, and the data formatting suggestion is one or more suggested presentations of the underlying data; and
   presenting the one or more insights.

2. The method of claim 1, wherein the underlying data is in tabular format and inferring the user data sets comprises:

identifying combinations of rows and columns within the underlying data that are of interest to a user.

3. The method of claim 2, further comprising:
identifying the combinations of rows and columns based on one or more of a type of the underlying data, a context of data processing, a structure of the underlying data, a usage history of the user, and a credential of the user.

4. The method of claim 1, wherein analyzing the user data sets comprises:
performing one or more of statistical, transformational, heuristic analyses on the user data sets to determine the one or more insight.

5. The method of claim 1, further comprising:
creating a background by one of converting a tabular presentation of the underlying data to a three dimensional background image, selecting an image associated with the underlying, data, and selecting a graphic associated with the underlying data;
placing the visualization over the background such that a correlation between the underlying data and the visualized insight is presented.

6. The method of claim 5, further comprising:
displaying a miniaturized graphic representation of the background and the visualization for selection of visualizations of insights associated with multiple user data sets.

7. The method of claim 1, further comprising one or more of:
generating multiple visualizations for a single data set, each visualization highlighting a different insight; and
generating different visualizations for multiple data sets associated with the user within a spreadsheet.

8. The method of claim 1, further comprising:
displaying one or more textual and graphical highlights on the visualization emphasizing selected data points.

9. A computing device configured to provide automatic recognition and insight derivation on data, the computing device comprising:
a memory;
a display device; and
a processor coupled to the memory and the display device, the processor adapted to execute a data processing application in conjunction with instructions stored in the memory, wherein the data processing application is configured to:
receive underlying data;
infer user data sets within the underlying data based on one or more of a type of the underlying data, a context of data processing, a structure of the underlying data, a usage history of the user, and a credential of the user;
analyze the user data sets through one or more of statistical, transformational, heuristic analyses on the user data sets;
determine one or more insights on the user data sets based on analysis results, the one or more insights including one or more of a trend, a correlation, an outlier, a pattern, and a comparison for each data set or combinations of data sets;
present a visualization of one or more user data sets highlighting an insight associated with each data set from the one or more insights, an emphasis on presented raw underlying data, and a data formatting suggestion, wherein the visualization is a chart highlighting the insight, the emphasis on the presented raw underlying data is one of a shading and a highlighting of a portion of the raw underlying data, and the data formatting suggestion is one or more suggested presentations of the underlying data.

10. The computing device of claim 9, herein the data processing application is further configured to:
initiate the automatic recognition and presentation of the insights automatically upon loading of the underlying data to the data processing application or detecting activation of a control element.

11. The computing device of claim 9, wherein the data processing application is further configured to:
enable the user to further explore the underlying data and the presented insights by selecting available choices to adjust a visualization configuration, switching to the underlying data, and trying alternative scenarios based on the presented insights based on one or more of predefined parameters, user selectable parameters, and automatically configurable parameters.

12. The computing device of claim 11, wherein the visualization configuration includes one or more of a color scheme, a border style scheme, a relative size, a placement, a perspective, and the data processing application is further configured to:
present the available choices through one or more of a dropdown menu, a radial menu, a pop-up menu, and a direct action on the visualization based on touch or gesture input.

13. The computing device of claim 11, wherein the data processing application is further configured to:
detect user actions following presentation of the one or more insights; and
employ a machine learning algorithm to adjust future determination and presentation of insights based on the detected user actions.

14. The computing device of claim 9, wherein the data processing application is one of a spreadsheet application, a database application, a presentation application, a note taking application, and a word processing application.

15. A computer-readable memory device with instructions stored thereon for providing automatic recognition and insight derivation on data, the instructions comprising:
receiving underlying data in a spreadsheet;
inferring user data sets within the spreadsheet based on one or more of a type of the underlying data, a context of data processing, a structure of the underlying data, a usage history of the user, and a credential of the user;
analyzing the user data sets through one or more of statistical, transformational, heuristic analyses on the user data sets;
determining one or more insights on the user data sets based on analysis results, wherein the insights including one or more of a trend, a correlation, an outlier, a pattern, and a comparison for each data set or combinations of data sets;
presenting a visualization of one or more user data sets highlighting an insight associated with each data set from the one or more insights, an emphasis on presented raw underlying data, and a data formatting suggestion; and
presenting the insights as one or more visualizations over a correlated background by:
creating a background by one of converting a tabular presentation of the underlying data to a three dimensional background image, selecting an image associated with the underlying data, and selecting a graphic associated with the underlying data;

placing the visualization over the background such that a correlation between the underlying data and the visualized insight is presented.

16. The computer-readable memory device of claim 15, wherein the instructions further comprise:
displaying suggested charts highlighting discovered insights as pages under each analyzed sheet of the spreadsheet that includes multiple sheets of underlying data.

17. The computer-readable memory device of claim 15, wherein the insights further include one or more of overall statistics about the underlying data, a number of dimensions associated with the user data sets, a number of incomplete rows within the user data sets, a percentage of useless data within the user data sets, a number of selected data types and values within the underlying data, a concentration of data inside one or more entities within the underlying data, a growth trend, and extreme values.

* * * * *